United States Patent [19]
Gerszberg et al.

[11] Patent Number: 5,983,080
[45] Date of Patent: Nov. 9, 1999

[54] APPARATUS AND METHOD FOR GENERATING VOICE SIGNALS AT A WIRELESS COMMUNICATIONS STATION

[75] Inventors: Irwin Gerszberg, Kendall Park; Jesse Eugene Russell, Piscataway; Robert Edward Schroeder, Morris Township, all of N.J.

[73] Assignee: AT & T Corp, New York, N.Y.

[21] Appl. No.: 08/868,404

[22] Filed: Jun. 3, 1997

[51] Int. Cl.⁶ .................................................. H04B 17/00
[52] U.S. Cl. ...................................... 455/67.3; 455/226.2
[58] Field of Search ................................. 455/67.3, 222, 455/223, 296, 226.2, 312, 63, 303, 306, 307; 704/208, 214, 226, 227, 228, 233; 375/346, 350; 381/98; 370/252, 331

[56] References Cited

U.S. PATENT DOCUMENTS

| | | | |
|---|---|---|---|
| 4,761,829 | 8/1988 | Lynk, Jr. et al. | 455/312 |
| 5,095,534 | 3/1992 | Hiyama | 455/307 |
| 5,193,210 | 3/1993 | Nicholas et al. | 455/226.2 |
| 5,239,684 | 8/1993 | Ishikura | 455/226.2 |
| 5,430,894 | 7/1995 | Nohara et al. | 455/296 |
| 5,483,690 | 1/1996 | Schroder | 455/222 |
| 5,596,570 | 1/1997 | Soliman | 455/67.3 |
| 5,630,016 | 5/1997 | Swaminathan et al. | 704/228 |
| 5,630,210 | 5/1997 | Marry et al. | 455/67.3 |
| 5,678,221 | 10/1997 | Cahill | 455/312 |
| 5,745,844 | 4/1998 | Kromer et al. | 455/226.2 |
| 5,754,666 | 5/1998 | Nakagawa | 381/98 |
| 5,839,061 | 11/1998 | Hendrickson et al. | 455/226.3 |

*Primary Examiner*—Dwayne D. Bost
*Assistant Examiner*—Quochien B. Vuong

[57] ABSTRACT

An apparatus and a method for generating voice signals for a wireless communication station. The wireless communications stations includes a receiver, a signal strength measuring device, a filter and a noise generator. The receiver receives a digitally modulated radio voice signal and the signal strength measuring device measures a signal strength of the received radio voice signal. The filter removes noise signals present with the received radio voice signal when the signal strength is below a predetermined threshold, and the a noise generator generates a noise signal for combination with the received voice signal.

8 Claims, 2 Drawing Sheets

APPARATUS AND METHOD FOR GENERATING VOICE SIGNALS AT A WIRELESS COMMUNICATIONS STATION

BACKGROUND OF THE INVENTION

1. Field of the Invention

The present invention relates to the field of telecommunications. More particularly, the present invention relates to an apparatus and a method for enhancing telecommunications service provided by a digital wireless communications system.

2. Description of the Related Art

There is a rapid voice signal quality deterioration experienced with digital wireless communications systems when a received signal-to-interference ratio (SIR) is below a minimum SIR, or when a bit error rate is exceeded at a wireless station. The rapid deterioration experienced in voice quality results in the received signal being interspersed with audible clicks and pops, causing difficulty for a digital wireless user in understanding received voice signals.

FIG. 1 shows a graph of voice signal quality versus average RF signal-to-interference ratio comparison of IS-54 digital and analog FM performance at a wireless station. In FIG. 1, curve 10 represents the voice signal quality for an IS-54 wireless station as a function of average RF SIR. The voice signal quality shown by curve 10 is fairly constant for signal-to-interference ratios greater than about 17 dB (point 10a). For SIRs below about 17 dB, the voice signal quality rapidly deteriorates with decreasing SIR. At an SIR of about 14 dB, the voice signal quality of an digital wireless station falls below an acceptable level. Curve 11 in FIG. 1 represents the voice signal quality of an analog FM wireless station as a function of average RF SIR. The voice signal quality shown by curve 11 is fairly constant for signal-to-interference ratios greater than about 26 dB (point 11a). For SIRs below about 26 dB, the voice signal quality deteriorates with decreasing SIR. At an SIR of about 17 dB, the voice signal quality of an analog FM wireless station falls below an acceptable level.

As shown in FIG. 1, when the SIR of a received digital signal drops, the quality of the voice signal deteriorates an accelerated rate. When a digital wireless station has a call-waiting feature capability, an incoming call tone received during poor voice signal quality and coinciding voice communications may be misinterpreted by a user as part of an on-going noise disruption. Consequently, the incoming call tone may be improperly ignored by the user.

What is needed is a way to simulate the fading characteristic of an analog FM wireless station for a wireless digital communications station, and to indicate that a call waiting signal has been received when a received SIR of a voice signal is below a predetermined threshold.

SUMMARY OF THE INVENTION

The present invention provides a way to simulate the fading characteristic of an analog FM wireless station for a wireless digital communications station, and a way to indicate that a call waiting signal has been received when a received SIR of a voice signal is below a predetermined threshold.

The advantages of the present invention are provided by an apparatus and a method for generating voice signals for a wireless communication station. According to the invention, the wireless communications stations includes a receiver, a signal strength measuring device, a filter and a noise generator. The receiver receives a digitally modulated radio voice signal and the signal strength measuring device measures a signal strength of the received radio voice signal. The filter removes noise signals present with the received radio voice signal when the signal strength is below a predetermined threshold, and the noise generator produces a white noise signal for combination with the received voice signal. A display controller coupled to the signal strength measuring device enables the display to display a visual indication of a call waiting indication in the event that the signal strength falls below the predetermined threshold and when a call waiting signal is received. Preferably, the noise generator inserts the noise signal into the received voice signal so that a voice quality of the received voice signal has an effective average RF signal-to-noise ratio corresponding to a wireless analog FM station having the same average RF signal-to-noise ratio.

BRIEF DESCRIPTION OF THE DRAWING

The present invention is illustrated by way of example and not limitation in the accompanying figures in which like reference numerals indicate similar elements and in which.

DETAILED DESCRIPTION

Figure 1:
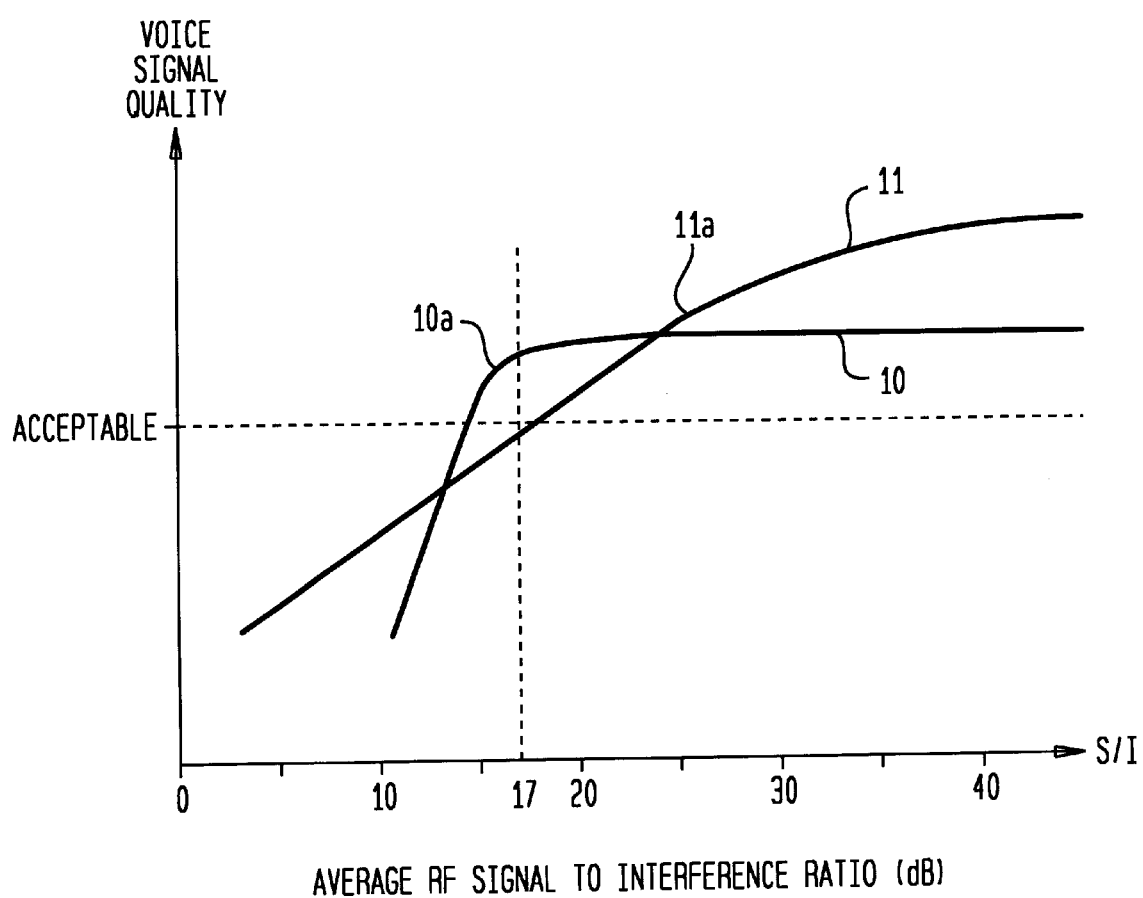
FIG. 1 shows a graph of voice signal quality vs. signal-to-interference ratio performance for an IS-54 digital and an analog FM wireless station.
Figure 2:
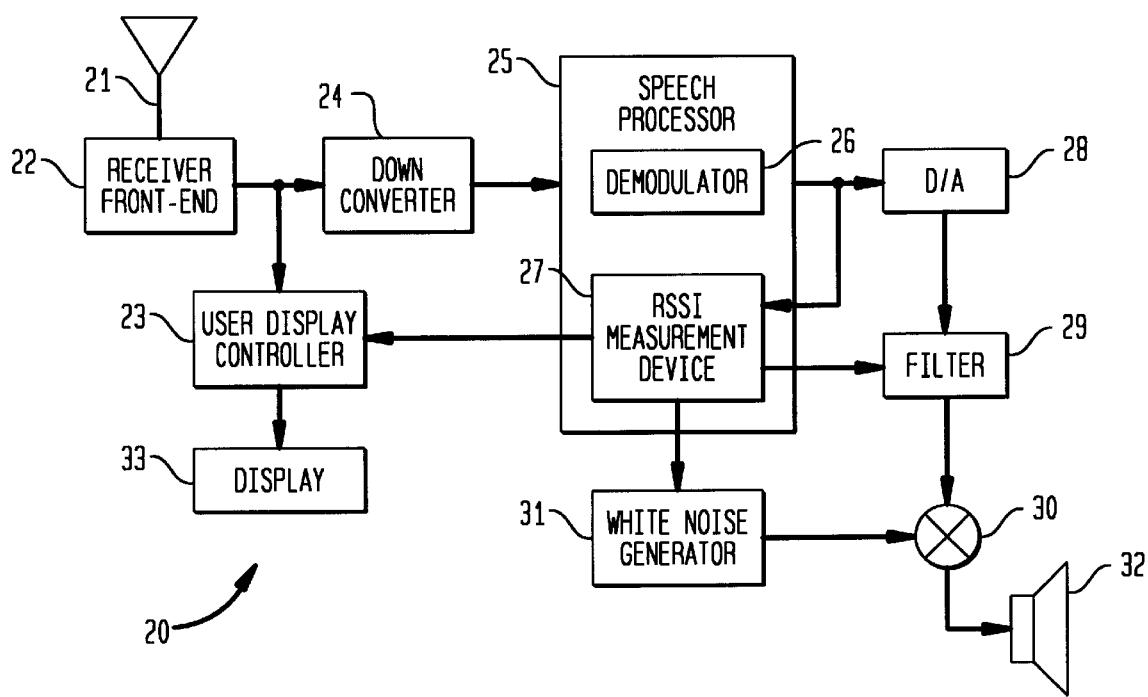
FIG. 2 is a schematic block diagram of a digital wireless station according to the present invention.

FIG. 2 shows a schematic block diagram of a digital wireless station 20 according to the present invention. Wireless station 20 includes an antenna 21, a receiver front-end 22, a user display controller 23, a downconverter 24, a speech processor 25, a digital-to-analog (D/A) converter 28, a filter 29, a mixer 30, a white noise generator 31, a speaker 32 and a display 33. Speech processor 25 includes a demodulator 26 and a received signal strength indicator (RSSI) measurement device 27.

Radio voice signals are received by antenna 21 and receiver front-end 22. The output of receiver front-end 22 is downconverted by downconverter 24 and applied to speech processor 25 for well-known digital signal processing and demodulation by demodulator 26. The signal strength of the voice output from speech processor 25 is measured by RSSI measurement device 27 in a well-known manner before being converted to an analog voice signal by D/A converter 28.

When the RSSI measurement of the voice signal is below a predetermined threshold corresponding to a mean RF SIR of, for example, 15 dB, RSSI measurement device 27 enables filter 29 so that bursty-type noise signals on the voice signal are filtered out. White noise generator 31 is also enabled by RSSI measurement device so that a white noise signal is generated that is combined with the filtered voice signal by mixer 30 in a well-known manner. The output of mixer 30 is applied to speaker 32 for audible output. As the RSSI measurement of the voice signal drops further below the predetermined threshold, the output level of white noise generator 31 is controlled in a well-known manner so that the effective SIR experienced for the received voice signal approximates curve 11 below an SIR of 15 dB, thus simulating fading of an analog FM communications system. When the RSSI measurement of the voice signal is greater than the predetermined threshold, neither filter 29 nor white noise generator 31 are enabled and conventional digital radio processing techniques are used so that the effective SIR experienced for the received voice signal approximates curve 10 above an SIR of 15 dB.

During reception and processing of voice radio signals that have a mean RF SIR that are below the predetermined threshold, the RSSI measurement device enables user display controller so that display 33 will visually indicate reception of a call waiting signal, thus reducing user confusion of the audible call waiting tone for noise caused by a low SIR.

While the present invention has been described in connection with the illustrated embodiments, it will be appreciated and understood that modifications may be made without departing from the true spirit and scope of the invention.

What is claimed is:

1. A method for generating voice signals for a wireless communication station, the method comprising the steps of:

receiving a digitally modulated RF voice signal;

measuring a signal strength of the received voice signal;

removing noise signals present with the received radio voice signal when the signal strength is below a predetermined threshold;

generating a noise signal when the signal strength is below the predetermined threshold; and combining the generated noise signal with the received voice signal.

2. The method according to claim 1, wherein the step of combining the generated noise signal into the received voice signal includes the step of combining the generated noise signal so that a voice quality of the received voice signal has an effective average RF signal-to-noise ratio corresponding to a wireless analog FM station having a same average RF signal-to-noise ratio.

3. The method according to claim 2, wherein the step of generating a noise signal generates the white noise signal.

4. The method according to claim 2, further comprising the step of displaying an indication that an incoming call has been received when the signal strength is below the predetermined threshold.

5. A wireless communications station comprising:

a receiver receiving a digitally modulated radio voice signal;

a signal strength measuring device coupled to the receiver, the signal strength measuring device measuring a signal strength of the received radio voice signal;

a filter coupled to the signal strength measuring device, the filter removing noise signals present with the received radio voice signal when the signal strength is below a predetermined threshold; and a noise generator, coupled to the signal strength measuring device, the noise generator generating a noise signal for combination with the received voice signal.

6. The wireless communications station according to claim 5, wherein the noise generator combines the noise signal with the received voice signal so that a voice quality of the received voice signal has an effective average RF signal-to-noise ratio corresponding to a wireless analog FM station having a same average RF signal-to-noise ratio.

7. The wireless communications station according to claim 6, wherein the noise generator generates a white noise signal.

8. The wireless communications station according to claim 6, further comprising:

a display; and a display controller coupled to the signal strength measuring device, the display controller enabling the display to display a call waiting indicator when the signal strength is below the predetermined threshold and a call waiting signal is received.

* * * * *